(12) United States Patent
Seo et al.

(10) Patent No.: US 10,991,099 B2
(45) Date of Patent: Apr. 27, 2021

(54) METHOD AND SYSTEM FOR MEASURING REPRESENTATIVE VALUE OF DUCT IN VIVO

(71) Applicant: Coreline Soft Co., Ltd, Seoul (KR)

(72) Inventors: Hyungi Seo, Seoul (KR); Donghoon Yu, Seoul (KR); Jaeyoun Yi, Seoul (KR); Joon Beom Seo, Seoul (KR); Nam Kug Kim, Seoul (KR)

(73) Assignee: CORELINE SOFT CO., LTD., Seoul (KR)

( * ) Notice: Subject to any disclaimer, the term of this patent is extended or adjusted under 35 U.S.C. 154(b) by 79 days.

(21) Appl. No.: 16/411,378

(22) Filed: May 14, 2019

(65) Prior Publication Data

US 2019/0378273 A1 Dec. 12, 2019

(30) Foreign Application Priority Data

May 14, 2018 (KR) .................. 10-2018-0054924

(51) Int. Cl.
 *G06T 7/00* (2017.01)
 *G06T 7/62* (2017.01)
(52) U.S. Cl.
 CPC .............. *G06T 7/0014* (2013.01); *G06T 7/62* (2017.01); *G06T 7/97* (2017.01); *G06T 2207/20081* (2013.01); *G06T 2207/30101* (2013.01)

(58) Field of Classification Search
 CPC ............ A61B 5/05; G06T 2207/20081; G06T 7/0014; G06T 7/62
 See application file for complete search history.

(56) References Cited

U.S. PATENT DOCUMENTS

| 5,891,030 | A | 4/1999 | Johnson et al. |
| 6,690,816 | B2 | 2/2004 | Aylward et al. |
| 2004/0249270 | A1 | 12/2004 | Kondo et al. |
| 2005/0070784 | A1* | 3/2005 | Komura ............... A61B 5/055 600/410 |
| 2017/0173262 | A1* | 6/2017 | Veltz .................. A61B 5/0022 |
| 2020/0041261 | A1* | 2/2020 | Bernstein ............. A61B 34/10 |

FOREIGN PATENT DOCUMENTS

JP 2004-283373 A 10/2004

* cited by examiner

*Primary Examiner* — John J Lee
(74) *Attorney, Agent, or Firm* — Nelson Mullins Riley & Scarborough LLP; Kongsik Kim, Esq.

(57) ABSTRACT

Disclosed is a method for measuring a representative value of a duct in vivo, the method including: selecting, by selection unit, at least one duct and sampling measurement sites in each duct; measuring, by creation unit, at least one real cross-section image being sampled to obtain measurement values and creating a measurement cross-section image; in comparing, by comparison-decision unit, the measurement cross-section image with the real cross-section image and evaluating validity of measurement values whether to accept the measurement values as data; and computing, by computation unit, a representative value out of the measurement values accepted as data.

10 Claims, 9 Drawing Sheets

Prior Art

Prior Art

METHOD AND SYSTEM FOR MEASURING REPRESENTATIVE VALUE OF DUCT IN VIVO

CROSS REFERENCE TO RELATED APPLICATIONS

This application claims the benefit and priority of Korean Patent Application No. 10-2018-0054924, filed on May 14, 2018. The entire disclosure of the above application is incorporated herein by reference.

FIELD

The present disclosure generally relates to a method and system for measuring a representative value of a conduit in vivo, and more particularly, to a high reliability method and system for measuring a representative value of a conduit in vivo.

BACKGROUND

This section provides background information related to the present disclosure which is not necessarily prior art.

FIG. 1(A) and FIG. 1(B) show an example of an analytic processing system of tube-like structures illustrated in Japanese Patent Application Laid-Open No. 2004-283373.

At least one of a volume rendered image based on 3D image data, a planar reformatted image on a random cross-section, or an MIP (Maximum Intensity Projection) image is created, and a blood vessel center line is extracted from the image created. A stretched blood vessel image along the center line and/or a cross-section image almost orthogonal to the central line is also obtained. Based on this stretched blood vessel image and/or orthogonal cross-section image thus obtained, morphology of the blood vessel is analyzed. At the same time, the image is matched with the volume rendered image, planar reformatted image or MIP image and then displayed with the analysis result.

There are several techniques necessary for a software that involves an efficient observation and quantitative interpretation of the shape of a blood vessel, on the basis of the 3D image of the blood vessel obtained with a CT/MRI. The following are examples of those primary techniques:

(1): A vertical view of a reference VR/MIP/MPR screen and a downward view of the cross-section image orthogonal to the center line of the blood vessel are combined, and a cursor bar of the orthogonal cross-section image and a curved MPR image (straight view) along the blood vessel center line are combined, providing three screens.

(2): The extracted blood vessel center line is converted into a smooth curve, and a blood vessel surface going about the blood vessel center line is obtained. The resulting contour points are connected to yield a smooth curved surface. The smooth blood vessel center line and the smooth curved surface are then resampled, and an image is displayed.

(3): When the blood vessel center line is made smooth, a penalty is imposed on a curvature of the blood vessel center line such that the radius of curvature of the blood vessel center line is larger than the radius of the blood vessel.

As illustrated in FIG. 1(A) and FIG. 1(B), the lumen area, average diameter, practical diameter, minimum diameter and maximum diameter of a blood vessel can be computed using the center line of the blood vessel. However, when the technique being used involves the observation of a blood vessel and 3D drawing of a center line and contour of the blood vessel, there are several things to consider. For example, a contour line on the cross-section perpendicular to the center line presents a 3D space, and contour lines may come across if the center line is not smooth. When this occurs, the contour may have greater irregularities, creating a very unnatural look. This leads to lower precision on the quantitative analysis of the cross section area or thickness of a target blood vessel.

SUMMARY

This section provides a general summary of the disclosure and is not a comprehensive disclosure of its full scope or all of its features.

These and other advantages of the present invention will be recognized by those of skill in the art in view of the following detailed description, the accompanying drawings and the appended claims.

DETAILED DESCRIPTION

The present disclosure will now be described in detail with reference to the accompanying drawing(s).

Figure 1A:
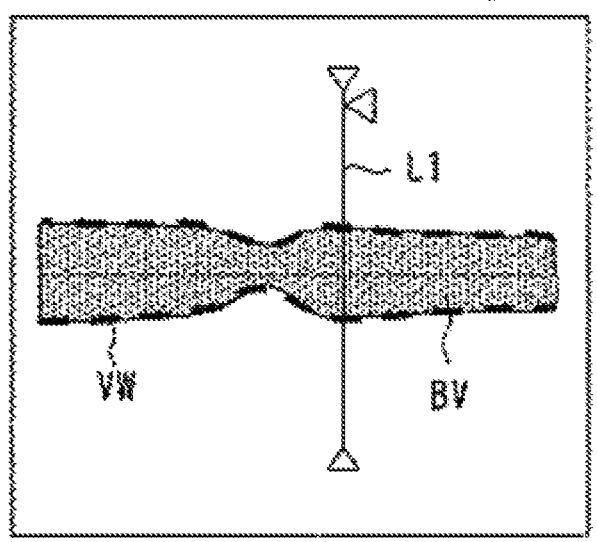
FIG. 1A and FIG. 1B show an example of an analytic processing system of tube-like structures illustrated in Japanese Patent Application Laid-Open No. 2004-283373.
Figure 1B:
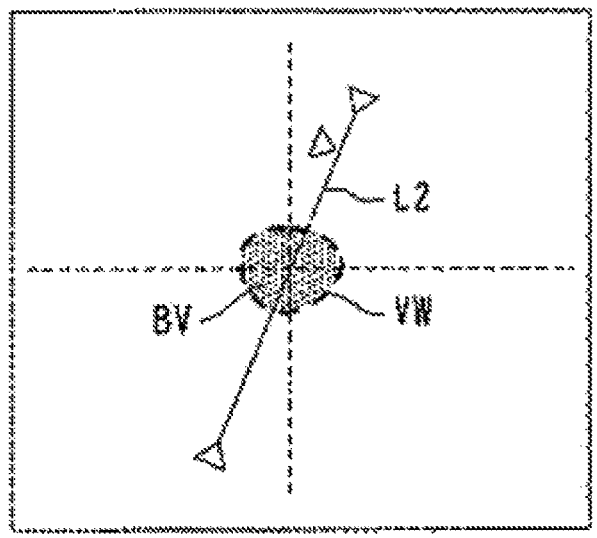
Figure 2:
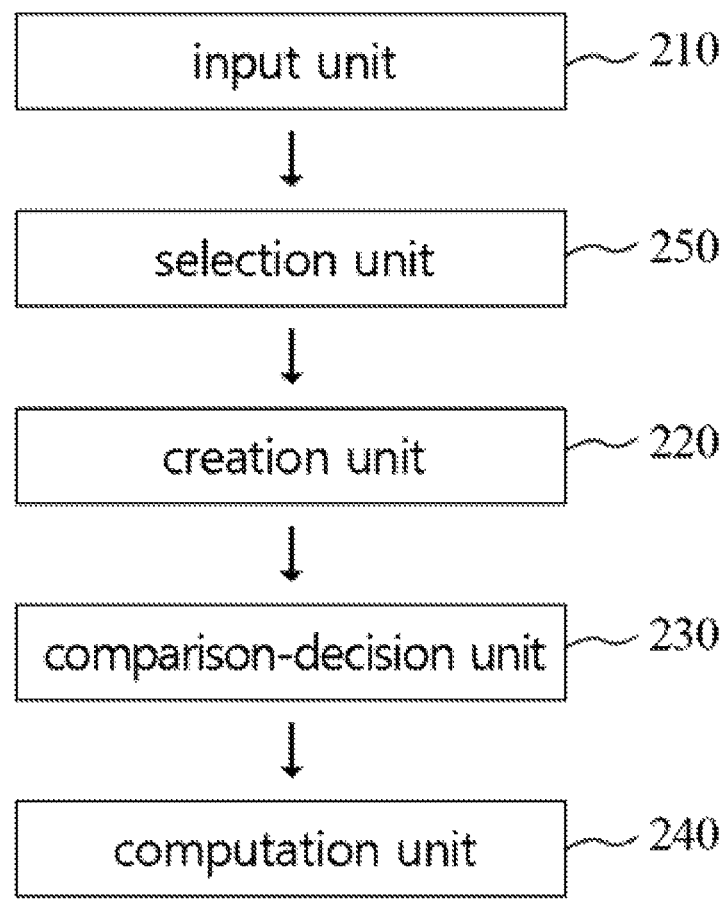
FIG. 2 shows an exemplary embodiment of a system for measuring a representative value of a duct in vivo according to the present disclosure.

FIG. 2 shows an exemplary embodiment of a system for measuring a representative value of a duct in vivo according to the present disclosure.

The system for measuring a representative value of a duct in vivo includes an input unit 210, a selection unit 250, a creation unit 220, a comparison-decision unit 230, and a computation unit 240.

The input unit 210 receives a command from the user. The input unit 210 is provided in the form of a keyboard, a mouse or a touch pad to be able to receive commands from the user. In particular, the input unit 210 receives a user command to select at least one duct. Examples of input types include the size, kind, location, name, and section of a target duct, and at least one of these input types can be provided.

The selection unit 250 selects at least one duct, in accordance with user inputs. For example, following the command given, the selection unit 250 selects at least one of the size, kind, location, name, or section of a target duct. The term "duct" herein indicates one of tracheas, bronchi, bronchioles, digestive organs, blood vessels, ureters, or neural canals, through which at least one of gas, liquid or solid matters run within the body. Moreover, once the selection unit 250 located at least one duct based on the user input, it performs sampling of measurement sites in each duct.

The creation unit 220 measures outer and inner walls of the duct on each of real cross-section images taken at those sampled measurement sites in the duct, and creates a measurement cross-section image therefrom. In other words, the creation unit 220 creates a measurement cross-section image based on the measurements of densities starting from the center of the duct on the real cross-section image, and of outer and inner walls of the duct, separated from its lumen. That is, the creation unit 220 creates a measurement cross-section image using those measurement values obtained. To do so, the creation unit 220 also places the measurement cross-section image in a position to be overlapped with the real cross-section image.

The comparison-decision unit 230 compares and determines the validity of measurement results. This comparison-decision unit 230 evaluates the validity by referring to a machine learning artificial intelligence model or statistical model, which can be divided into a good measurement group and a poor measurement group. The artificial intelligence model of the comparison-decision unit 230 only takes a valid measurement value and saves it as data, while excluding non-valid measurement values.

The real cross-section image includes walls and a lumen, and the creation unit 220 can measure, on the real cross-section image, at least one of the following: wall thickness, wall diameter, wall area, lumen diameter, and lumen area.

The computation unit 240 computes a representative value using the data accepted by the comparison-decision unit 230. The representative value corresponds to an average of the data. In particular, the representative value is obtained by calculating an average of the wall thicknesses or lumen diameters included in the data accepted by the comparison-decision unit 230.

For example, the wall thicknesses or lumen diameters of bronchioles located in the lungs can be averaged. Once the wall thicknesses or lumen diameters of bronchioles in a patient are known, they can be compared with those of other patients.

Therefore, it is now possible to obtain the analysis result for every branch in all bronchi. As the bronchi are sampled for measurement by branch and a representative value thereof is computed, this analysis can also be expanded further, as a function of generation or lobe (e.g., a lung lobe) of each branch. Moreover, the representative value thus obtained can have higher reliability. Traditionally, a patient's airway was analyzed by measuring walls of only two or three airways, and calculating a representative value of the measurements. The number of measurements was limited primarily because there were too many targets to be measured, and it required an extended period of time to complete the measurement process. In the present disclosure, however, it is allowed to analyze airway walls of all bronchi to obtain a representative value for a patient's airway such that the resulting representative value will provide increased reliability and have a higher correlation with a disease to be diagnosed.

Figure 3:
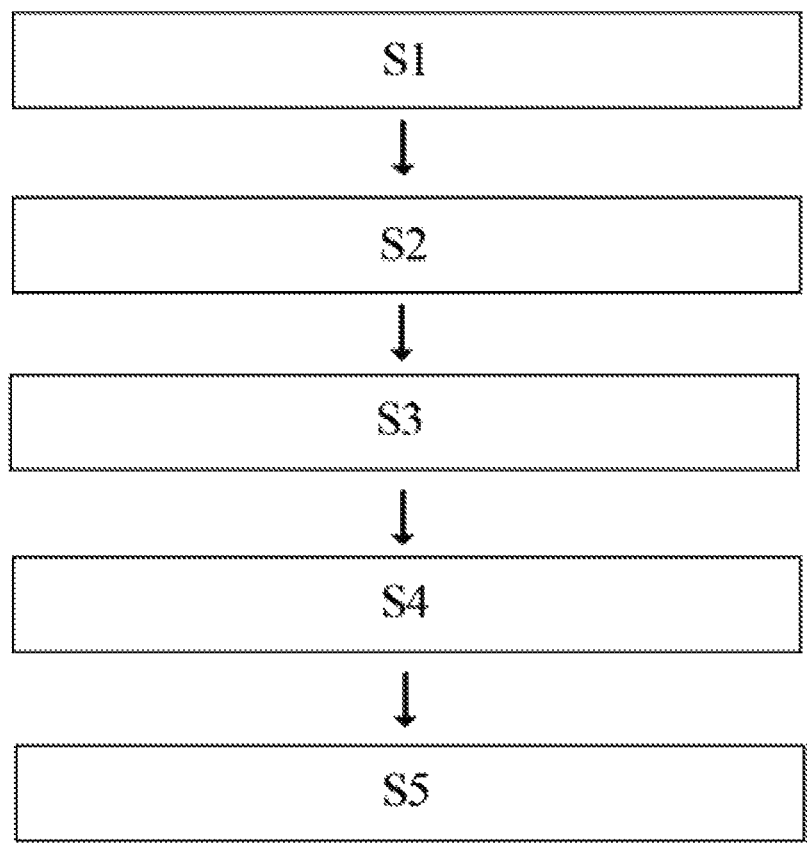
FIG. 3 shows an exemplary embodiment of a method for measuring a representative value of a duct in vivo in accordance with the present disclosure.

FIG. 3 shows a flowchart describing a method for measuring a representative value of a duct in vivo according to the present disclosure.

In the method for measuring a representative value of a duct in vivo, first of all, the input unit 210 (see FIG. 2) receives a user command for selecting at least one duct (S1).

The selection unit 250 (see FIG. 2) locates at least one duct according to the input and performs sampling of measurement sites in each duct (S2).

The creation unit 220 (see FIG. 2) obtains measurement values from a real cross-section image at those sampled measurement sites, and creates a measurement cross-section image (S3).

Next, the comparison-decision unit 230 (see FIG. 2) compares the created measurement cross-section image with the real cross-section image, and accepts or rejects data out of the measurement values (S4). In particular, artificial intelligence of the comparison-decision unit 230 conducts the comparison between the real cross-section image and the measurement cross-section image, and valid data as well as invalid measurement values may be used later for the artificial intelligence to relearn.

Finally, the computation unit 240 (see FIG. 2) computes a representative value using the accepted data.

Figure 4:
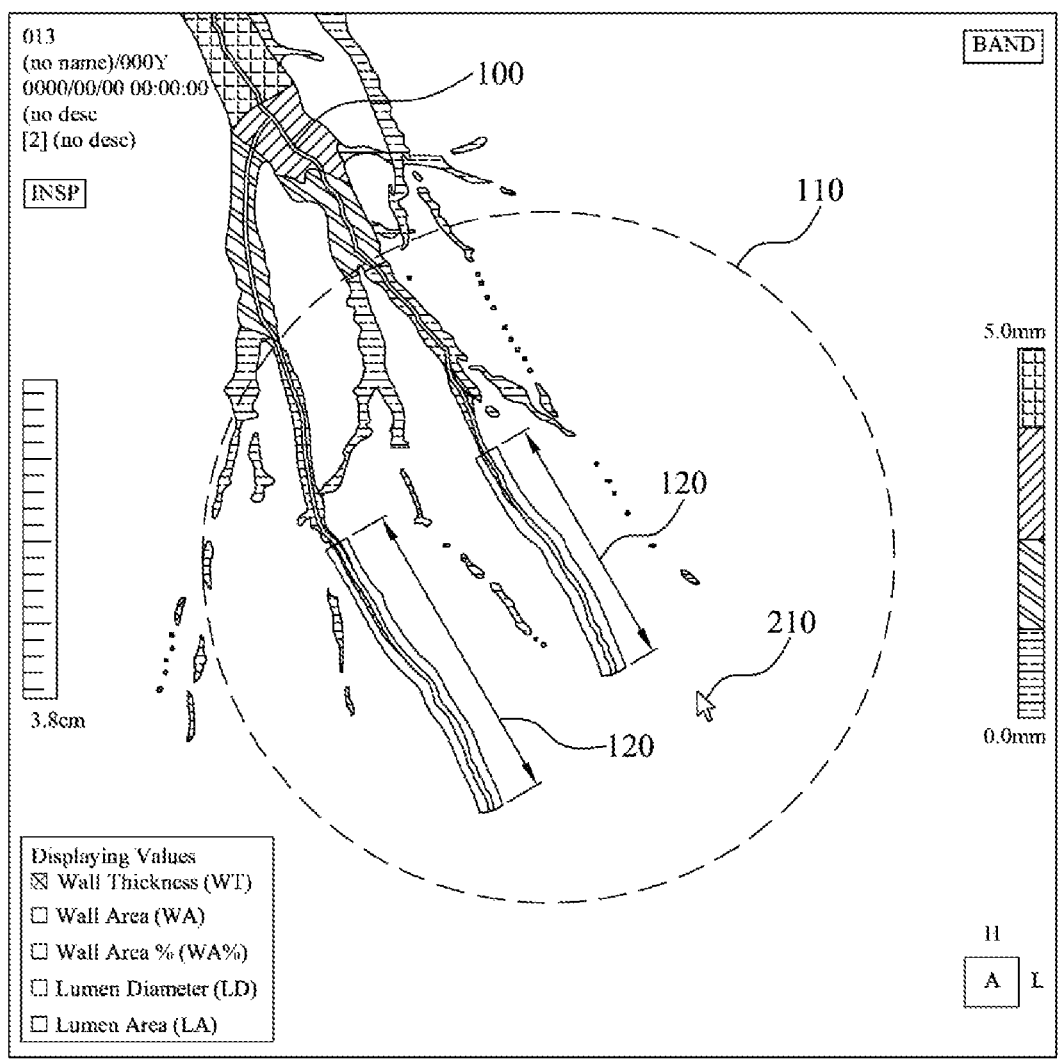
FIG. 4, FIG. 5 and FIG. 6 shows examples of implementing the measurement of a representative value of a duct in vivo in pulmonary airways according to the present disclosure.
Figure 5:
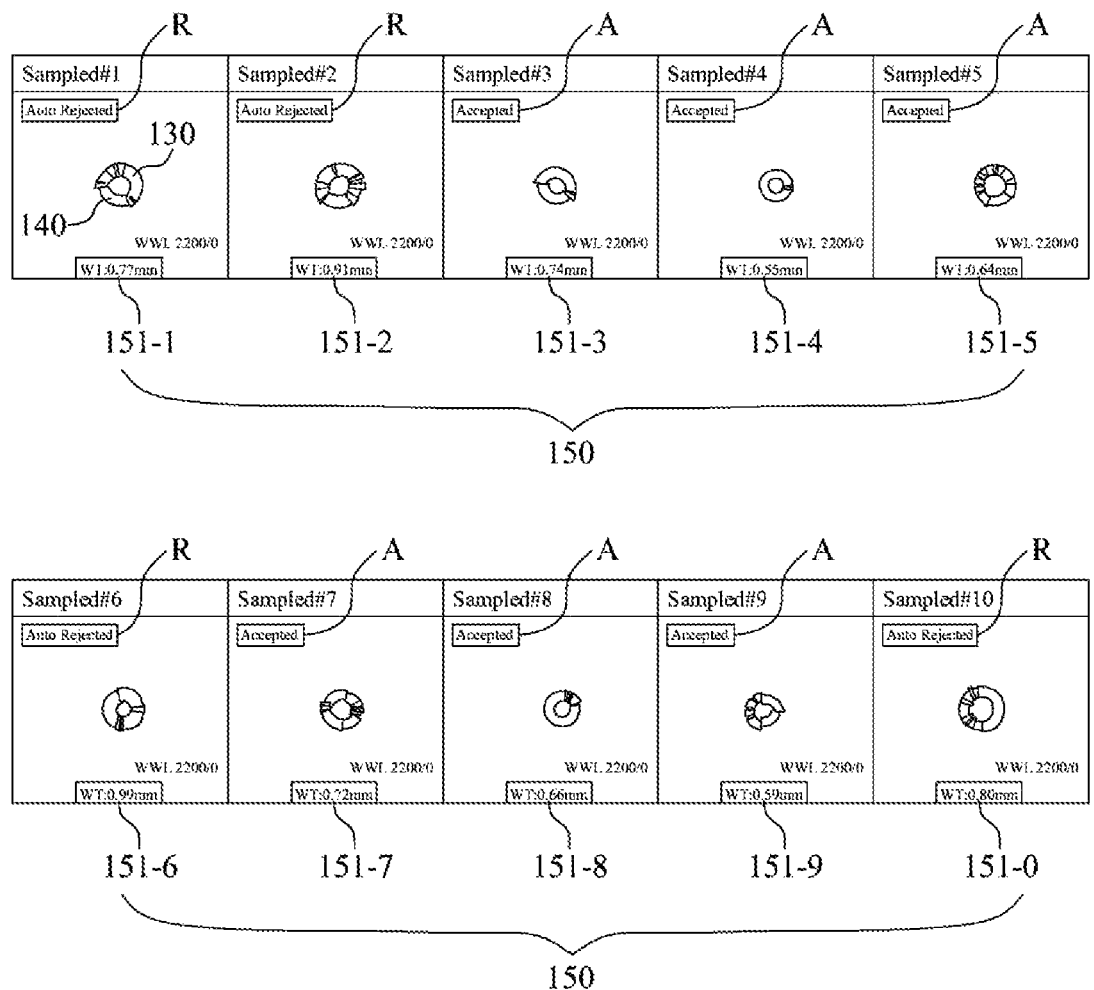
Figure 6:
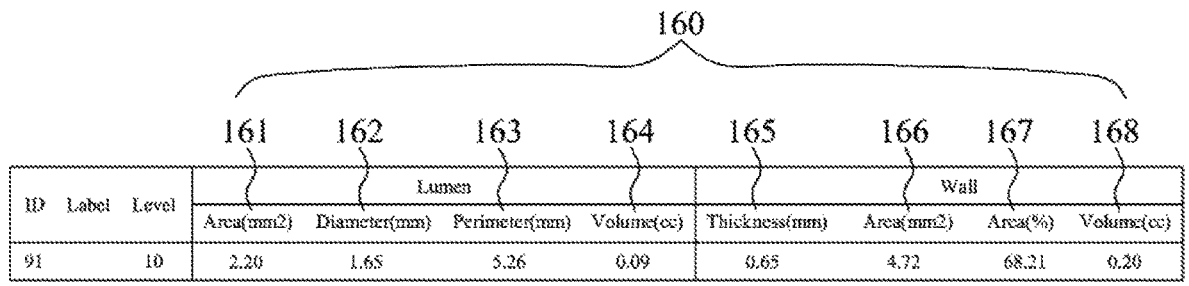

FIG. 4 to FIG. 6 shows examples of implementing the measurement of a representative value of a duct in vivo in pulmonary airways according to the present disclosure.

That is, an example of applying the present disclosure to pulmonary airways is illustrated in FIG. 4 to FIG. 6.

With reference to FIG. 4, the input unit 210 (see FIG. 2) selects a bronchiole 100 among pulmonary airways. The bronchiole 100 may be selected as a region of interest 110, or selected by its thickness, type, or name (not shown). Moreover, the user can designate sections 120 of the bronchiole 100, through the input unit 210. For instance, the user can use the input unit 210 to mark a start point and an end point in the respective section 120. Optionally, the section 120 can be selected automatically, which is carried out by the selection unit 250.

As shown in FIG. 5, the section 120 of the bronchiole 100 input by the input unit 210 (see FIG. 2) may be selected automatically, and the selection unit 250 then performs sampling on the section 120 of the bronchiole 100. Optionally, more than one bronchiole 100 can be selected. In this way, a more accurate and more reliably representative value can be obtained for the bronchiole 100.

The creation unit 220 (see FIG. 2) obtains measurement values from a real cross-section image 130, and creates a measurement cross-section image 140. In particular, the creation unit 220 measures each wall thickness and lumen diameter based on densities or brightness levels of the real cross-section image 140. In another alternative embodiment, measurement values of blood vessel walls can be obtained by measuring at least one of the following: CT aortic wall thickness, Brain MR vessel wall thickness using MRI Black blood, and the degree of calcification of a blood vessel.

The comparison-decision unit 230 (see FIG. 2) evaluates the validity of the measurement cross-section image 140 taken from the real cross-section image 130. A statistical model or machine learning artificial intelligence model is used as the evaluation criteria. In particular, the artificial intelligence of the comparison-decision unit 230 takes measurements on the real cross-section image 130. If it turns out that the measurement cross-section image 140 is not valid, the artificial intelligence gives an Auto Rejection (R) indication and does not accept the invalid measurement cross-section image as the data (151-1, 2, 6, 0). On the other hand, if it turns out that the measurement cross-section image 140 is valid, the artificial intelligence gives an Accepted (A) indication and accepts the valid measurement cross-section image as the data (151-3, 4, 5, 7, 8, 9). The computation unit 240 (see FIG. 2) then computes a representative value 160 using the accepted data (151-3, 4, 5, 7, 8, 9).

Therefore, it is the artificial intelligence of the comparison-decision unit 230 according to the present disclosure that compares the real cross-section image 130 with the measurement cross-section image 140 and determines the validity of the latter. The more the artificial intelligence of the comparison-decision unit 230 gathers statistical models or machine learning data, the more accurate and sophisticated the comparison-decision between the real cross-section image 130 and the measurement cross-section image 140 can be made.

The representative value 160 is obtained as shown in FIG. 6. The computation unit 240 calculates an average value of the accepted data (151-3, 4, 5, 7, 8, 9), as well as the area/diameter/perimeter/volume (capacity) of the lumen and the thickness/area ($mm^2$/%)/volume (capacity) of the wall, and provides the corresponding representative value 160.

Traditionally, only two or three bronchioles 100 were randomly selected for measurement and a representative value was derived therefrom. As such, the resulting representative value was less accurate and less reliable. In the present disclosure, however, all bronchioles 100 are automatically selected for sampling and subjected to the measurement of their lumens and walls. A representative value is then derived from those measurement values. In this way, the traditional time-consuming tedious process of manual measurement is now carried out in an automatic manner within a much shorter period of time. In addition, as the comparison-decision unit 230 compares the measurement cross-section image 140 with the real cross-section image 130 and evaluates the validity of a measurement value to accept the same as data, a highly accurate and highly reliable result can be provided.

FIG. 7 illustrate the operation of the comparison-decision unit according to the present disclosure.

Figure 7A:
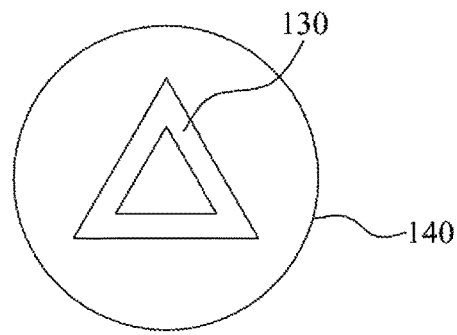
FIG. 7A, FIG. 7B and FIG. 7C illustrate the operation of a comparison-decision unit according to the present disclosure.
Figure 7B:
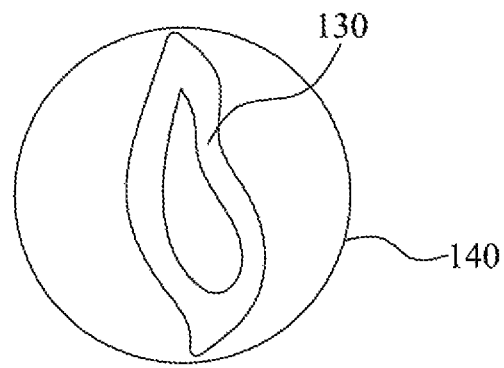
Figure 7C:
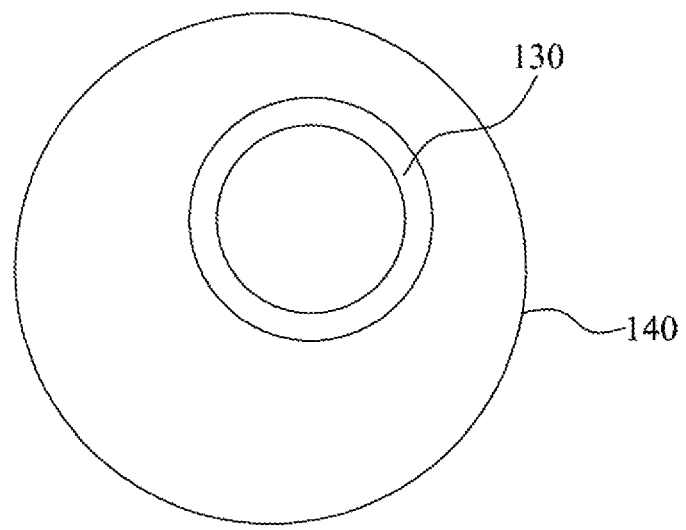

FIG. 7(A) to FIG. 7(C) show examples of the measurement cross-section images 140 which are overlapped with the real cross-section image 130 of a duct. As can be seen from these drawings, the measurement cross-section images 140 taken from the measurements on the real cross-section image 130 are not acceptable data. Referring to FIG. 7(A), the real cross-section image 130 of a duct is a triangular shape, while the measurement cross-section image 140 may be a circular shape. Referring to FIG. 7(B), the real cross-section image 130 of a duct is an oblong shape, while the measurement cross-section image 140 may be a circular shape. Referring to FIG. 7(C), the real cross-section image 130 of a duct is so much smaller than the measurement cross-section image 140. Despite the fact that there should not be a large difference between the measurement cross-section image 140 and the real cross-section image 130 being actually measured, all of the examples in FIG. 7(A), FIG. 7(B) and FIG. 7(C) show dissimilarities in the overlapped images. Thus, the measurement values thereof are not accepted as the data by the comparison-decision unit 230.

The comparison-decision unit 230 (see FIG. 2) evaluates the validity by referring to a machine learning artificial intelligence model or statistical model, which can be divided into a good measurement group and a poor measurement group as illustrated in FIG. 7. Further, those resulting measurement values including valid data and invalid measurement values may be used later for the artificial intelligence to relearn.

Figure 8:
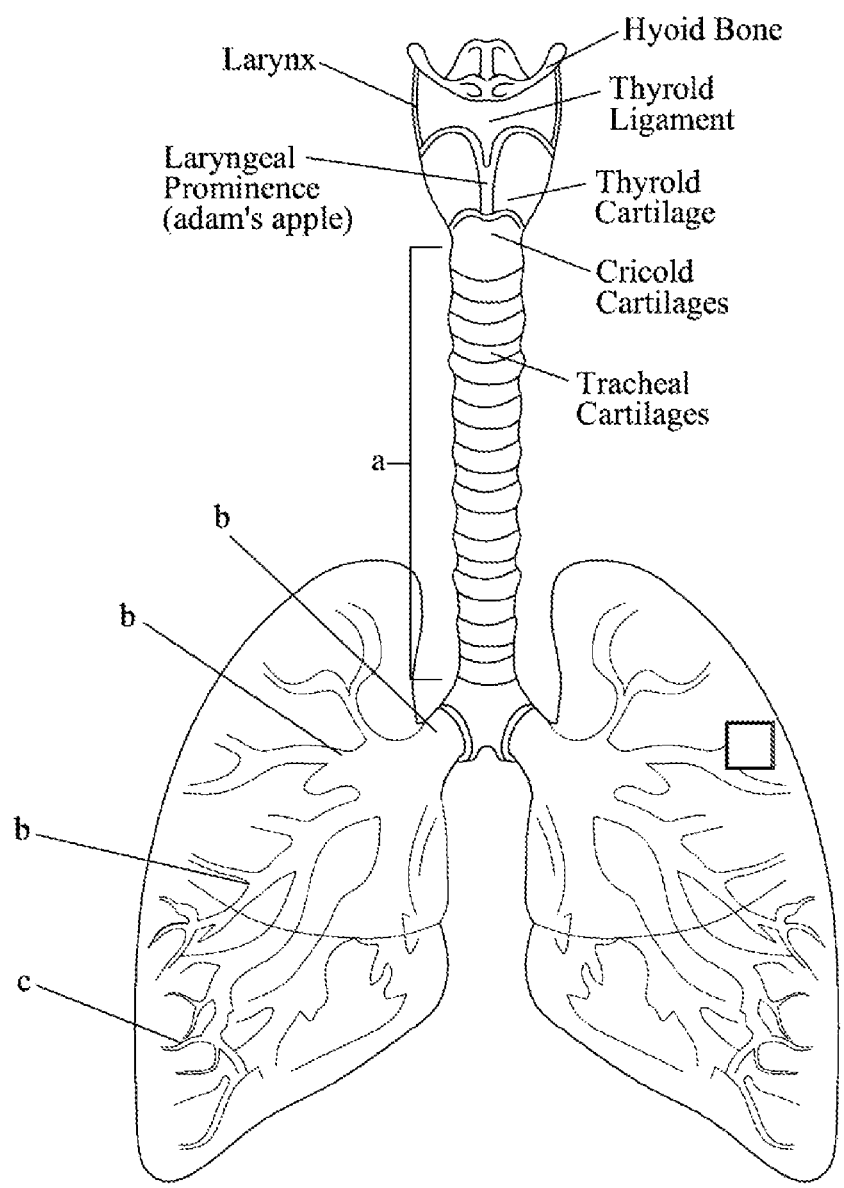
FIG. 8 shows an example of classified pulmonary airways by a selection unit according to the present disclosure.

FIG. 8 shows an example of classified pulmonary airways by a selection unit according to the present disclosure.

A detailed view of pulmonary airways is provided in FIG. 8. The pulmonary airways are divided into tracheas a, bronchi b, bronchioles c. The user can input one of them in the input unit 210. When a bronchiole c is inputted, the selection unit 250 selects all of bronchioles c among the pulmonary airways, and performs sampling on a certain section of the respective bronchioles c, allowing a representative value to be derived based on the comparison-decision result. In short, when the user desires to know the lumen diameter or the wall thickness of a duct of interest, the selection unit 250 of the present disclosure does not select a single duct of interest, but a plurality of equivalent ducts for deriving a representative value therefrom. As such, the representative value thus obtained can have increased accuracy and reliability.

Set out below are a series of clauses that disclose diverse features of further aspects of the present disclosure.

(1) A method for measuring a representative value of a duct in vivo, including: selecting, by selection unit, at least one duct and sampling measurement sites in each duct; measuring, by creation unit, at least one real cross-section image being sampled to obtain measurement values and creating a measurement cross-section image; in comparing, by comparison-decision unit, the measurement cross-section image with the real cross-section image and evaluating validity of measurement values whether to accept the measurement values as data; and computing, by computation unit, a representative value out of the measurement values accepted as data.

(2) There is also provided, the method of clause (1), wherein: the duct is at least one of tracheas, bronchi, bronchioles, digestive organs, blood vessels, ureters, or neural canals, through which at least one of gas, liquid or solid matters run within the body.

(3) There is also provided, the method of clause (1), wherein: the at least one duct is classified by at least one of size, kind, location, or name.

(4) There is also provided, the method of clause (1), wherein: the real cross-section image includes walls and a lumen, and the creation unit measures at least one of wall thickness, wall diameter, wall area, lumen diameter, lumen area, or degree of calcification.

(5) There is also provided, the method of clause (1), wherein: in evaluating, by comparison-decision unit, the validity of the measurement cross-section image taken from the real cross-section image and deciding whether to accept measurement values as data, the validity is evaluated by artificial intelligence of the comparison-decision unit.

(6) There is also provided, the method of clause (1), wherein: valid data as well as invalid measurement values can be used for the artificial intelligence to relearn.

(7) There is also provided, the method of clause (1), wherein: in computing, by computation unit, a representative value out of the measurement values accepted as data, the representative value corresponds to an average of the measurement values.

(8) There is also provided, the method of clause (1), wherein: in measuring, by creation unit, at least one real cross-section image being sampled to obtain measurement values and creating a measurement cross-section image, densities starting from the center of the duct on the real cross-section image are used to obtain measurements of the lumen and walls of the duct.

(9) There is also provided, the method of clause (1) further including: prior to selecting, by selection unit, at least one duct and sampling measurement sites in each duct, receiving, by the input unit, a user command.

(10) A system for measuring a representative value of a duct in vivo, the system including: a selection unit adapted to select at least one duct and perform sampling of measurement sites in each duct; a creation unit adapted to measure a real cross-section image at respective measurement sites to obtain measurement values and to create a measurement cross-section image; a comparison-decision unit adapted to compare the measurement cross-section image with the real cross-section image to evaluate conformance therebetween and to select valid measurement values as data; and a computation unit adapted to compute a representative value out of the measurement values accepted as data.

In an exemplary method for measuring a representative value in a duct in vivo according to the present disclosure, the representative value thus obtained has increased reliability.

In another exemplary method for measuring a representative value in a duct in vivo according to the present disclosure, the representative value can be obtained by performing an automatic sampling of multiple ducts.

In another exemplary method for measuring a representative value in a duct in vivo of the present disclosure, more reliable measurements can be conducted by evaluating the validity of a measurement cross-section image taken from a real cross-section image and by accepting certain measurement values as valid data.

DESCRIPTION OF REFERENCE NUMERALS

| | |
|---|---|
| 100: Duct | 110: Area of interest |
| 130: Real cross-section image | 140: Measurement cross-section image |
| 150: Measurement value | 160: Representative value |
| 210: Input unit | 220: Creation unit |
| 230: Comparison-decision unit | 240: Computation unit |
| 250: Selection unit | |

What is claimed is:

1. A method for measuring a representative value of a tubular structure in vivo, the method comprising:
    selecting, by selection unit, at least one tubular structure and sampling measurement sites in each tubular structure;
    measuring, by creation unit, at least one real cross-section image being sampled to obtain measurement values and creating a measurement cross-section image;
    in comparing, by comparison-decision unit, the measurement cross-section image with the real cross-section image and evaluating validity of the measurement values whether to accept the measurement values as data; and
    computing, by computation unit, the representative value out of the measurement values accepted as data.

2. The method of claim 1, wherein the tubular structure is at least one of tracheas, bronchi, bronchioles, digestive organs, blood vessels, ureters, or neural canals, through which at least one of gas, liquid or solid matters run within the body.

3. The method of claim 1, wherein the at least one tubular structure is classified by at least one of size, kind, location, or name.

4. The method of claim 1, wherein the real cross-section image comprises walls and a lumen, and wherein the creation unit measures at least one of wall thickness, wall diameter, wall area, lumen diameter, lumen area, or degree of calcification.

5. The method of claim 1, wherein, in comparing, by comparison-decision unit, the measurement cross-section image with the real cross-section image and evaluating validity of measurement values whether to accept the measurement values as data, the validity is evaluated by artificial intelligence of the comparison-decision unit.

6. The method of claim 5, wherein valid data as well as invalid measurement values are used for the artificial intelligence to relearn.

7. The method of claim 1, wherein, in computing, by computation unit, a representative value out of the measurement values accepted as data, the representative value corresponds to an average of the measurement values.

8. The method of claim 1, wherein, in measuring, by creation unit, at least one real cross-section image being sampled to obtain measurement values and creating a measurement cross-section image, densities starting from the center of the tubular structure on the real cross-section image are used to obtain measurements of the lumen and walls of the tubular structure.

9. The method of claim 1, further comprising: prior to selecting, by selection unit, at least one tubular structure and sampling measurement sites in each tubular structure, receiving, by the input unit, a user command.

10. A system for measuring a representative value of a tubular structure in vivo, the system comprising:
    a selection unit adapted to select at least one tubular structure and perform sampling of measurement sites in each tubular structure;
    a creation unit adapted to measure a real cross-section image at respective measurement sites to obtain measurement values and to create a measurement cross-section image;
    a comparison-decision unit adapted to compare the measurement cross-section image with the real cross-section image to evaluate conformance therebetween and to select valid measurement values as data from among the measurement values; and
    a computation unit adapted to compute the representative value out of the measurement values accepted as data.

* * * * *